United States Patent
Wu et al.

(10) Patent No.: US 8,169,356 B2
(45) Date of Patent: May 1, 2012

(54) ANTI-MASK MOTION SENSOR

(75) Inventors: Xiaodong Wu, Roseville, CA (US);
James N. Helland, Agoura Hills, CA (US); Leslie K. Green, Applegate, CA (US)

(73) Assignee: Honeywell International Inc., Morristown, NJ (US)

( * ) Notice: Subject to any disclaimer, the term of this patent is extended or adjusted under 35 U.S.C. 154(b) by 986 days.

(21) Appl. No.: 11/968,094

(22) Filed: Dec. 31, 2007
(Under 37 CFR 1.47)

(65) Prior Publication Data
US 2010/0283660 A1     Nov. 11, 2010

(51) Int. Cl.
*G01S 13/04*     (2006.01)
*G08B 13/181*     (2006.01)
*H01Q 19/10*     (2006.01)
*G01S 13/00*     (2006.01)
*G08B 13/00*     (2006.01)

(52) U.S. Cl. .............. 342/28; 342/27; 342/89; 342/175; 342/195; 342/368; 340/500; 340/540; 340/541; 340/552; 340/554; 343/700 R; 343/753; 343/755; 343/772; 343/776; 343/779; 343/781 R; 343/907; 343/912

(58) Field of Classification Search .............. 342/21, 342/27, 28, 59, 175, 192–197, 450–465, 342/89–103, 368–377; 340/500, 540, 541–567; 343/772–786, 834–840, 907, 912–916, 755, 343/700 R, 753, 872, 873, 700 MS
See application file for complete search history.

(56) References Cited

U.S. PATENT DOCUMENTS

| | | | | |
|---|---|---|---|---|
| 2,197,028 A | * | 4/1940 | Wolff | 342/27 |
| 2,660,718 A | * | 11/1953 | Summerhayes, Jr. et al. | 340/552 |
| 2,939,134 A | * | 5/1960 | Van Atta | 342/59 |
| 3,059,232 A | * | 10/1962 | Barker | 342/27 |
| 3,122,739 A | * | 2/1964 | Miles | 342/28 |
| 3,182,312 A | * | 5/1965 | Daniels | 342/28 |
| 3,193,823 A | * | 7/1965 | Laakmann | 342/28 |
| 3,242,486 A | * | 3/1966 | Corbell | 342/28 |
| 3,300,768 A | * | 1/1967 | Bystrom et al. | 340/552 |

(Continued)

FOREIGN PATENT DOCUMENTS
WO     WO 97-43662     11/1997

OTHER PUBLICATIONS
2006/2007 draft EN50131-2-4 G3 crawl test, p. 10.

(Continued)

*Primary Examiner* — Bernarr Gregory
(74) *Attorney, Agent, or Firm* — Husch Blackwell

(57) ABSTRACT

A motion sensing method and apparatus includes a housing enclosing a microwave motion sensor including an antenna, and a security system. The antenna may be a patch antenna which includes microwave radiating elements for transmitting and receiving a microwave signal for sensing motion. A reflector is attached to the housing and positioned above the antenna for downward shaping of the microwave signal. The microwave radiating elements together with the reflector provide a radiation pattern where a main beam is transmitted in a direction orthogonal to a surface of the antenna and a sided lobe is transmitted downward in amplitude below the microwave motion sensor. An alarm circuit indicates when the microwave sensor detects motion in armed mode, and a masking circuit indicates when the microwave sensor detects motion in a mask zone when the security system is unarmed. A second sensor may be positioned beneath the microwave motion sensor.

18 Claims, 5 Drawing Sheets

U.S. PATENT DOCUMENTS

| | | | | |
|---|---|---|---|---|
| 3,314,066 A * | 4/1967 | Schwartz et al. | | 342/27 |
| 3,343,167 A * | 9/1967 | Rademacher | | 342/28 |
| 3,383,678 A * | 5/1968 | Palmer | | 342/28 |
| 3,471,845 A * | 10/1969 | Sokoloff | | 340/552 |
| 3,560,970 A * | 2/1971 | Kamimura et al. | | 342/27 |
| 3,750,162 A * | 7/1973 | Seaton | | 342/28 |
| 3,806,941 A * | 4/1974 | Cheal | | 340/554 |
| 3,863,240 A * | 1/1975 | Galvin | | 340/553 |
| 3,886,549 A * | 5/1975 | Cheal et al. | | 342/28 |
| 3,890,615 A * | 6/1975 | Moran | | 342/28 |
| 3,903,520 A * | 9/1975 | Shostak | | 342/27 |
| 3,961,321 A * | 6/1976 | Moss | | 342/27 |
| 3,967,283 A * | 6/1976 | Clark et al. | | 342/28 |
| 3,986,182 A * | 10/1976 | Hackett | | 342/28 |
| 4,083,049 A * | 4/1978 | Mattern et al. | | 342/28 |
| 4,086,586 A * | 4/1978 | Spirig | | 340/550 |
| 4,090,203 A * | 5/1978 | Duncan | | 343/778 |
| 4,123,748 A * | 10/1978 | Otani | | 342/27 |
| 4,132,988 A * | 1/1979 | Blacksmith et al. | | 340/552 |
| 4,142,190 A * | 2/1979 | Kerr | | 343/840 |
| 4,187,508 A * | 2/1980 | Evans | | 343/779 |
| 4,527,151 A * | 7/1985 | Byrne | | 340/554 |
| 4,639,902 A * | 1/1987 | Leverance et al. | | 340/552 |
| 4,837,574 A * | 6/1989 | Hill | | 342/27 |
| 4,843,397 A * | 6/1989 | Galati et al. | | 342/59 |
| 5,191,343 A * | 3/1993 | Danzer et al. | | 342/21 |
| 5,424,745 A * | 6/1995 | Fonsny | | 342/28 |
| 5,786,760 A * | 7/1998 | Suzuki et al. | | 340/541 |
| 6,061,014 A * | 5/2000 | Rautanen et al. | | 342/28 |
| 6,114,956 A * | 9/2000 | Van Genechten | | 340/552 |
| 6,362,775 B1 * | 3/2002 | Goebel et al. | | 342/175 |
| 6,400,307 B2 * | 6/2002 | Fullerton et al. | | 342/28 |
| 6,466,157 B1 * | 10/2002 | Bjornholt et al. | | 342/28 |
| 7,084,761 B2 * | 8/2006 | Izumi et al. | | 340/541 |
| 7,567,200 B1 * | 7/2009 | Osterweil | | 342/28 |
| 2006/0267764 A1 * | 11/2006 | Morinaga et al. | | 342/28 |

OTHER PUBLICATIONS

Frenzel, Louis E., "Principles of Electronic Communication Systems," Chapter 14 entitled "Antennas and Wave Propagation" Section 14-1 "Antenna Fundamentals", Glencoe, 2nd Edition 2003, pp. 592-641.

* cited by examiner

ANTI-MASK MOTION SENSOR

BACKGROUND OF THE INVENTION

1. Field of the Invention

The present invention generally relates to microwave motion and Dual-Tech (Microwave/PIR) motion sensors, and more particularly, a method and apparatus using microwave motion sensors having a reflector for enhanced lookdown ability.

2. Description of the Related Art

Security systems and automated manufacturing systems, as well as, other automated processes are employing microwave (MW) motion sensors for motion detection. MW motion sensors typically include a microwave transceiver as an active device employing electromagnetic waves lower in frequency than visible light. MW motion sensors transmit a microwave signal toward a region to be monitored and in the event that movement is detected within the region, the microwave signal is reflected back (echo) from the movement and is modulated due to the Doppler Effect. When a signal is reflected from a moving object (target) it is shifted in frequency. This shift in frequency is called the Doppler Effect and is directly proportional to the targets velocity relative to the sensor. A maximum frequency shift is when the target is moving straight at the sensor, and a minimum frequency shift is observed if the target is moving at a 90 degree angle towards the target.

In certain security and other automated applications or systems, a MW sensor may be mounted on a wall to monitor a room or part of a room. In this situation a microwave reflector is employed to enhance the coverage of the MW motion sensor.

Known MW motion sensors may include an antenna having a plurality of microstrip radiating elements (antenna patches) and a strip of copper foil 130 disposed in front of the antenna aperture so as to reflect an upper portion of the emitted radiation from the plurality of microstrip radiating elements. An antenna aperture is the portion of a plane surface very near the antenna and normal to the direction of maximum radiant intensity through which the major part of the radiation passes. Thus, a reflector or strip of copper foil provides enhanced microwave amplitude at low incident angles, thereby effectively reducing a blind zone beneath the microwave transmitters by reflecting part of the main beam. Such MW motions sensors are described in Applicant's co-owned copending application U.S. Ser. No. 11/940,038 which is herein incorporated by reference in its entirety.

A drawback of current MW motion sensors is that they enhance detection underneath the sensor by reflecting part of the main beam. Thus, the loss of strength of the main beam may be detrimental to detection in the protected region by the antenna. Further, current MW motion sensors and systems do not provide for detection of tampering, e.g., masking to the MW/Dual Tech sensors, to disable the sensors when the security system is in unarmed/disarmed mode. Masking may include damaging or covering the MW or Dual Tech motion sensors when the security system is not armed to disable the sensor for later use when it is armed.

Therefore, a need exists for a system or method to detect tampering of a MW or Dual Tech motion sensor to ensure the operability of the sensor when armed or in alarm mode.

SUMMARY OF THE INVENTION

In an aspect of the invention, a method for detecting motion in a security system includes: positioning a microwave sensor within a housing which includes a security system, and the microwave sensor includes an antenna having a microwave radiating element; transmitting and receiving a microwave signal for detecting motion using the antenna; downwardly shaping the microwave signal; initiating an alarm signal when the microwave sensor detects motion; and initiating a mask condition signal when the microwave sensor detects nearby motion (mask zone, for example, a few inches away) when the security system is unarmed. The method may further include inwardly shaping the microwave signal. The method may also further include inwardly shaping the microwave signal toward a central longitudinal axis extending through the antenna. Additionally, the method may include shaping the microwave signal to substantially encompass a second sensor having a different sensing or detecting technology than the microwave sensor, and the second sensor positioned substantially beneath the antenna. In a related aspect, the alarm signal is initiated when the microwave signal detects motion within a main protection zone. In another related aspect, the mask condition signal is initiated when the microwave signal detects motion within a mask zone.

In another aspect of the invention, a motion detecting apparatus in a security system includes a housing including a security system. A microwave sensor includes an antenna positioned within the housing, and the antenna includes at least one microwave radiating element for transmitting and receiving a microwave signal for detecting motion. A reflector is attached to the housing and positioned above the antenna for downward shaping the microwave signal. An alarm circuit indicates when the microwave sensor detects motion when the security system is in an armed mode, and a masking circuit indicates when the microwave sensor detects motion within a specified mask zone when the security system is unarmed. In a related aspect, the reflector reflects energy downwardly using a predetermined shape of the reflector to produce a specified microwave signal pattern. The reflector may be arcuate with respect to opposite edges of the antenna, or the reflector may be planar. Further, the antenna may include a plurality of microwave radiating elements. Additionally, the apparatus may further include a second sensor having a different sensing or detecting technology than the microwave sensor, and the second sensor positioned substantially beneath the antenna such that the second sensor is substantially encompassed by the microwave signal. Further, the alarm circuit may indicate when the microwave signal detects motion within a main protection zone.

In another aspect of the invention, a microwave motion sensor, comprises: an antenna having a planar surface, and the antenna including at least one microwave radiating element for transmitting and receiving a microwave signal for detecting motion; and a reflector being arcuate in relation to the planar surface of the antenna and being positioned above the antenna for downward shaping the microwave signal. In a related aspect, the antenna includes a plurality of microwave radiating elements, or the antenna includes an array of microwave radiating elements. Further, the reflector may be arcuate with respect to a planar surface of the antenna, or the reflector may be arcuate with respect to opposite edges of the antenna.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE INVENTION

Figure 1:
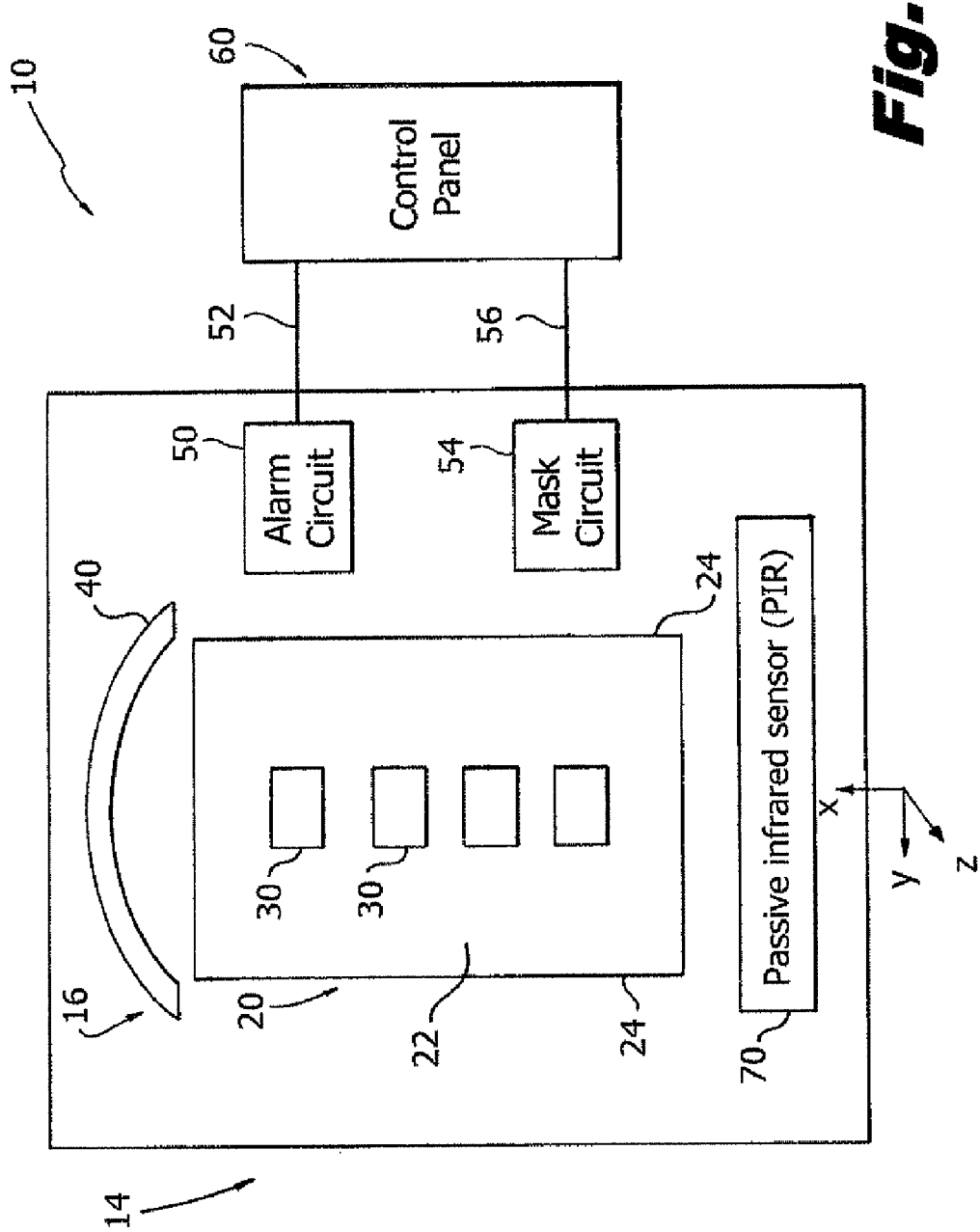
FIG. 1 is a block diagram of a motion detecting apparatus including a housing holding a microwave motion sensor including an antenna having microwave radiating elements and a curved reflector arcuate in the Y direction, and the motion sensing apparatus includes alarm and mask circuits which can be the outputs of a microprocessor, connected to a control panel.
Figure 4:
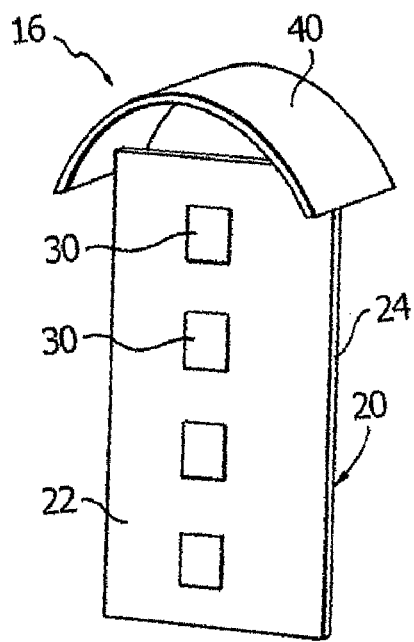
FIG. 4 is a perspective view of the microwave motion sensor shown in FIG. 1.

An illustrative embodiment of a motion sensing/detecting apparatus or security system 10 and a method for the same according to the present invention is shown in FIG. 1, and includes a housing 14 defining an internal cavity encasing a microwave motion sensor 16. The microwave motion sensor 16 (also shown in FIG. 4) includes an antenna 20 which is positioned and attached within the housing 14 and includes a planar surface 22 and opposing edges 24. The antenna 20 includes microwave radiating elements 30 for transmitting and receiving a microwave signal for sensing motion. A reflector 40 is attached to the housing 14 and positioned above the antenna for downward shaping the microwave signal. The reflector 40 reflects energy downwardly using a predetermined shape of the reflector 40, which in the embodiment shown in FIG. 1 is arcuate in relation to the planar surface 22 of the antenna 20 or arcuate in relation to opposite edges 24 of the antenna 20 (in the y direction), to produce a specified microwave signal pattern.

The motion sensing/detecting apparatus 10 further includes an alarm circuit 50 connected to, for example, a microprocessor (not shown) for indicating when the microwave sensor detects motion when in an armed mode a signal processing circuit and a microprocessor (not shown) for indicating when the microwave signal of the antenna 20 senses or detects motion. A mask circuit 54 communicates with, for example, the microprocessor (not shown) for indicating when the microwave sensor detects nearby motion in a mask zone when the security system is disarmed or unarmed. A control panel 60 is connected to the alarm circuit 50 via lead 52 and to the mask circuit 54 via lead 56. The control panel provides a local or remote location to monitor the status of the alarm and mask circuit 50, 54, respectively. The control panel may include a signal or indicator to communicate when the mask circuit has been initiated, thus, indicating that a tampering may have occurred.

Further referring to FIG. 1, second sensor embodied as a passive infrared sensor (PIR) 70 is positioned beneath the microwave motion sensor 16. The PIR 70 is a different sensing or detecting technology than the microwave sensor 16. The PIR 70 detects infrared radiation for detecting, for example, an intruder in a secure area. For example, such devices are described in the co-owned and copending applications U.S. Ser. Nos. 11/781,669 and 11/778,742 which are herein incorporated by reference in their entirety.

In operation, the method for sensing motion according to the present invention includes positioning the antenna 20 within the housing and transmitting and receiving the microwave signal for sensing motion using the antenna 20. The microwave signal is downwardly shaped using the reflector 40 positioned above the antenna 20. The microwave signal is also inwardly shaped or shaped toward a central longitudinal axis extending through the antenna 20 using the reflector 40 shown in FIGS. 1 and 4.

The alarm circuit 50 initiates an alarm signal when the microwave sensor 16 detects motion in the armed mode. The alarm signal may be local or remote at the control panel 60 or both. Additionally, the alarm may include all types of indicators including auditory and visual. The mask circuit 54 initiates a masking signal when the microwave sensor detects nearby motion in the mask zone when the security system is unarmed or disarmed. Similarly, the masking signal may be local or remote at the control panel 60 or both, and may include all types of indicators including auditory and visual. Thereby, tampering or masking, or an attempt to tamper with, or mask, the motion sensing apparatus 10 when the security system 10 is unarmed, and appropriate action can be taken to inspect for and correct tampering.

Figure 2:
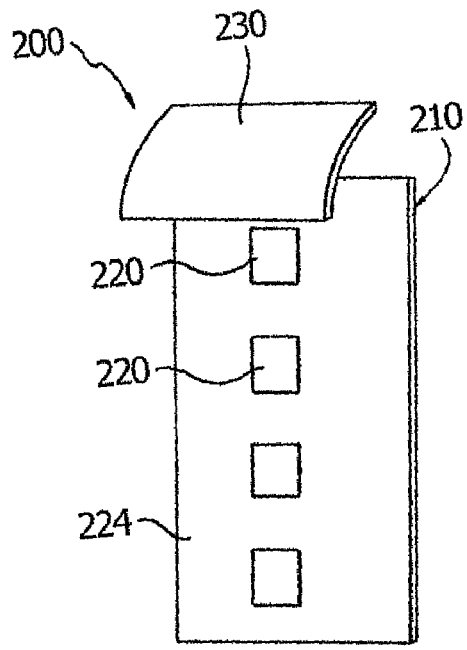
FIG. 2 is a perspective view of another embodiment of a microwave motion sensor having a curved reflector which is arcuate in the Z direction.
Figure 5:
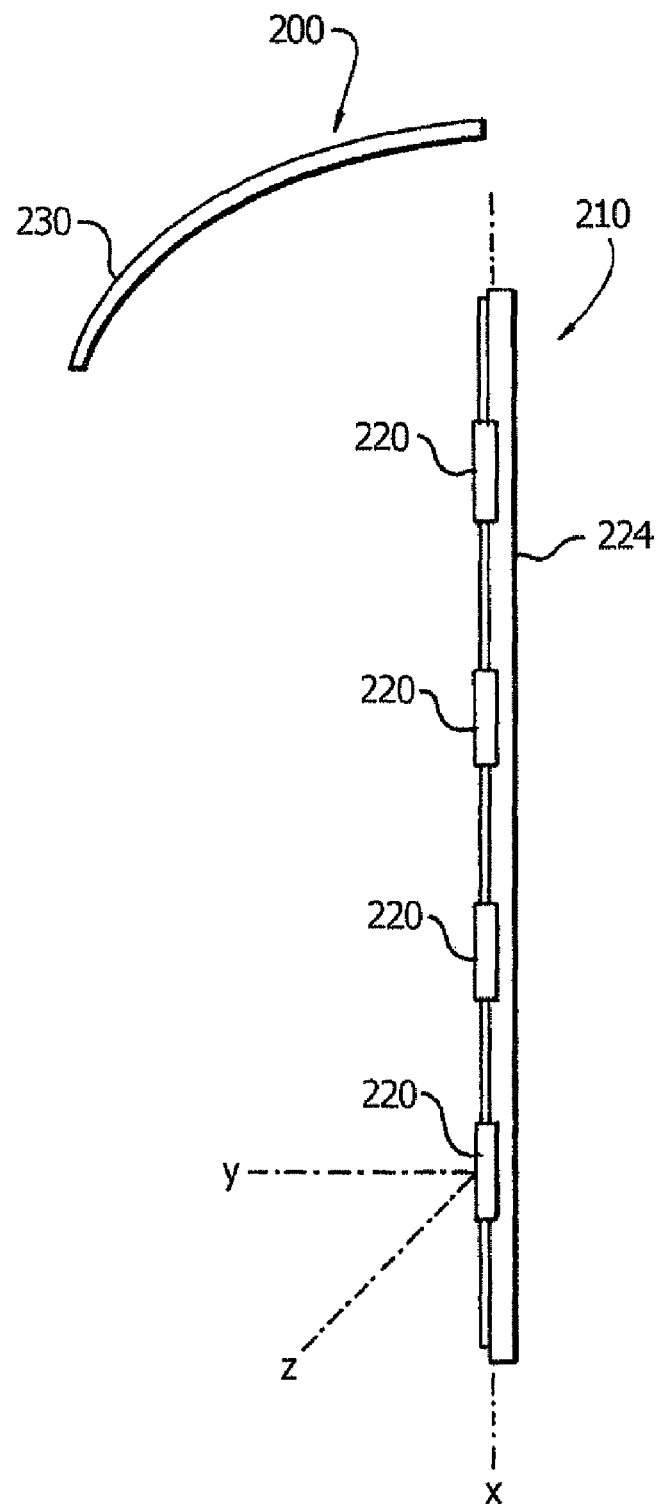
FIG. 5 is a side view of the microwave motion sensor and reflector shown in FIG. 2.

Referring to FIGS. 2 and 5, a microwave motion sensor 200 includes enhanced lookdown ability. The motion sensor 200 includes an antenna 210 with a plurality of microwave radiating elements 220 in a 1×4 array configuration over a ground plate 224. A reflector 230 is positioned over the antenna 210 by, for example, attachment to a housing (not shown). The antenna 210 is arcuate and curves in relation to the edges of the antenna 210 (in the z direction), and is disposed above the plurality of microwave radiating elements 220. The antenna is not limited to a 1×4 array, but could be any antenna. The reflector is not limited to a curved reflector could be any shape which gives the desired enhanced pattern.

The microwave radiating elements 220 are patch antennas which are well known in the art as a metal patch suspended over a ground plane 224. The patches can be used alone or be part of an antenna array for pattern shaping as shown. In one embodiment, the antenna operates in the k-band, however the present invention is not limited to that spectrum and can operate in other bands as known to those skilled in the art. Each microwave transceiver 200 transmits and receives back microwave signals according to the Doppler principle as discussed above. The antenna could consist of appropriate placed radiating slots instead of patches.

The antenna 210 consisting of the microwave radiating elements 220 provides a specific radiation pattern in appropriate amplitude and phase relationships as known to those skilled in the art. The antenna 210 composed of the radiating elements 220 radiates according to a predetermined radiation pattern according to Cartesian coordinates X, Y, and Z. The reflector 230 further shapes the radiation pattern of the antenna 210 and the radiating elements 220. The reflector 230, according to one embodiment of the present invention can have other dimensions and shapes as known to those skilled in the art taking into account the size of the antenna and the wavelength employed.

Figure 7:
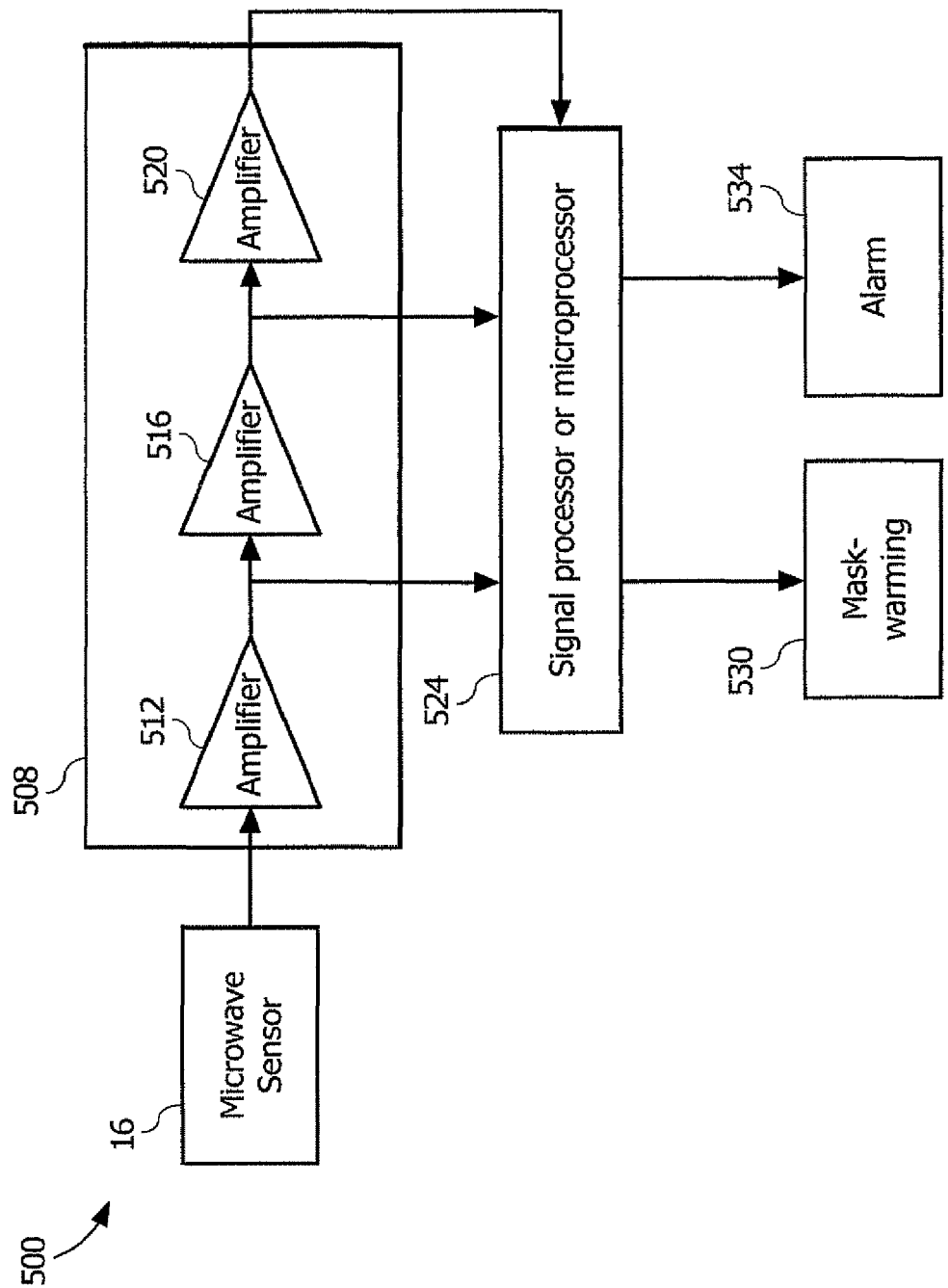
FIG. 7 is a block diagram of another embodiment of a masking and alarm circuit for the motion sensing apparatus or system shown in FIG. 1.

Referring to FIG. 7, in an alternative embodiment, a masking and alarm circuit 500 for the microwave motion sensor 16 (shown in FIGS. 1 and 4) may include the microwave sensor 16 communicating with signal conditioning circuitry 508 including intermediate frequency amplifiers such as, a first amplifier 512 which output indicates a specified very close target, a second amplifier 516 which output indicates a specified close target, and a third amplifier 520 for normal operation, i.e., when the alarm is armed. The first, second and third amplifiers 512, 516, 520, respectively, electrically communicate with a signal processor or microprocessor 524 which initiates a fault signal or mask warning 530, or an alarm 534.

Figure 3:
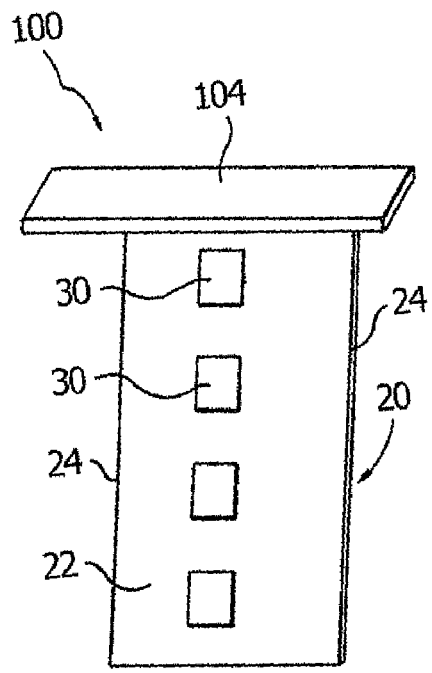
FIG. 3 is a perspective view of another embodiment of the invention including a microwave motion sensor having a planar reflector.

Referring to FIG. 3, a microwave motion sensor 100 according to another embodiment of the invention having enhanced lookdown ability includes the antenna 210 and plurality of microwave radiating elements 220 in a 1×4 array configuration over the ground plate 224 as in the previous embodiment shown in FIG. 2. However, in the microwave motion sensor 100, a reflector 104 is planar. The planar reflector is positioned above the antenna 210 in a similar manner as in the other embodiments shown in FIGS. 2 and 4.

Figure 6:
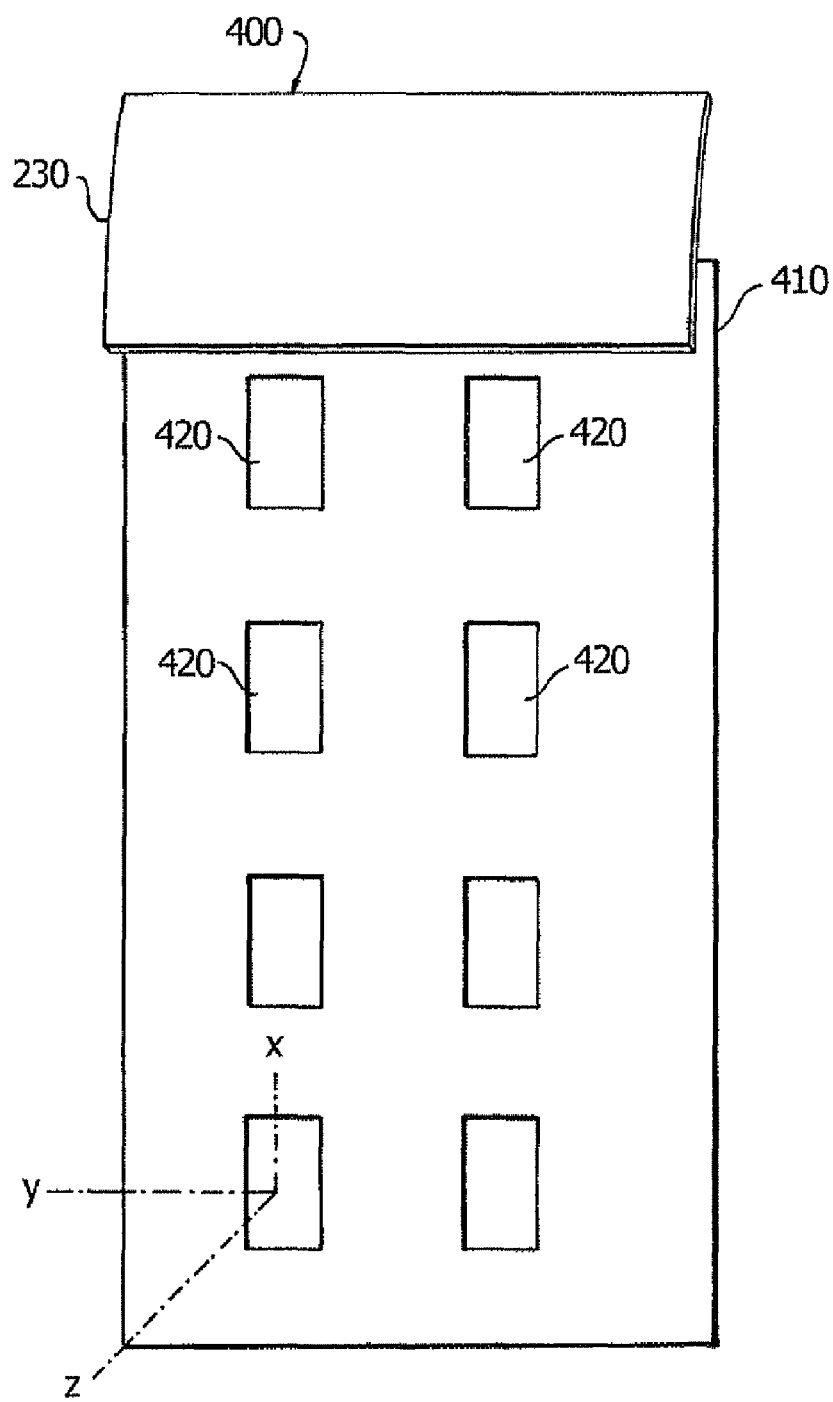
FIG. 6 is a perspective view of another embodiment of a microwave motion sensor having an array of microwave radiating elements and an arcuate or curved reflector in the X direction.

Referring to FIG. 6, another embodiment of the invention includes a microwave motion sensor 400 including a 2×4 array of microwave radiating elements 420 forming an antenna 410. The microwave motion sensor 400 may be used in the housing 14 of the motion sensing apparatus 10 shown in FIG. 1. Additionally, the antenna 410 may be used with the reflector 40 shown in FIGS. 1 and 4. The array of microwave radiating elements 420 can be any n×m arrays as known to those skilled in the art. As can be seen in FIG. 6, an antenna 410 consisting of the microwave radiating elements 420 is configured in a 2×4 array configuration. In addition, the reflector 230 is shown having a curved shape and disposed above the plurality of microwave radiating elements 420. The antenna 410 consisting of the microwave radiating elements 420 provides a specific radiation pattern in appropriate amplitude and phase relationships as known to those skilled in the art.

One implementation of the present invention is a wall mounted motion sensor for use in intruder detection, as in security systems. For example, the motion sensing apparatus 10 shown in FIG. 1 can be mounted on a wall at a height of 10 feet from the floor and still detect an object below within 0.5 meters away from the wall. This requires the antenna to have an enhanced beam width between 60° and 90° of the downsidelobe 620R. Hence, the present invention provides enhanced coverage directly below the microwave motion detector. In the event the microwave motion sensor 16 of the security system 10 detects motion when the security system 10 is in an unarmed/disarmed mode, a mask condition signal is initiated. The detected motion is, for example, near the security system 10 in the specified or predetermined mask zone, which may be, for example, several inches from the PIR sensor 70. A main protection zone may be much larger than the mask zone for protecting a secure area when the security system 10 is armed.

While there has been shown and described what is considered to be illustrated embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method for detecting motion in a security system, comprising:
    positioning a microwave sensor within a housing which includes a security system, and the microwave sensor includes an antenna having a microwave radiating element;
    transmitting and receiving a microwave signal for detecting motion using the antenna;
    downwardly shaping the microwave signal;
    initiating an alarm signal when the microwave sensor detects motion; and
    initiating a mask condition signal when the microwave sensor detects motion when the security system is unarmed.

2. The method of claim 1, further including inwardly shaping the microwave signal.

3. The method of claim 1, further including inwardly shaping the microwave signal toward a central longitudinal axis extending through the antenna.

4. The method of claim 1, further including:
    shaping the microwave signal to substantially encompass a second sensor having a different sensing or detecting technology than the microwave sensor, and the second sensor positioned substantially beneath the antenna.

5. The method of claim 1, wherein the alarm signal is initiated when the microwave signal detects motion within a main protection zone.

6. The method of claim 1, wherein the mask condition signal is initiated when the microwave signal detects motion within a mask zone.

7. A motion detecting apparatus in a security system, comprising:
    a housing including a security system;
    a microwave sensor including an antenna positioned within the housing, and the antenna including at least one microwave radiating element for transmitting and receiving a microwave signal for detecting motion;
    a reflector attached to the housing and positioned above the antenna for downward shaping the microwave signal;
    an alarm circuit for indicating when the microwave sensor detects motion when the security system is in an armed mode; and
    a masking circuit for indicating when the microwave sensor detects motion within a specified mask zone when the security system is unarmed.

8. The apparatus of claim 7, wherein the reflector reflects energy downwardly using a predetermined shape of the reflector to produce a specified microwave signal pattern.

9. The apparatus of claim 7, wherein the reflector is arcuate with respect to opposite edges of the antenna.

10. The apparatus of claim 7, wherein the reflector is planar.

11. The apparatus of claim 7, wherein the antenna includes a plurality of microwave radiating elements.

12. The apparatus of claim 7, further including a second sensor having a different sensing or detecting technology than the microwave sensor, and the second sensor positioned substantially beneath the antenna such that the second sensor is substantially encompassed by the microwave signal.

13. The apparatus of claim 7, wherein the alarm circuit indicates when the microwave signal detects motion within a main protection zone.

14. A microwave motion sensor antenna system, comprising:
    an antenna, at least a portion of the antenna including a planar surface, and the antenna including at least one microwave radiating element disposed on the planar surface for transmitting and receiving a microwave signal for detecting motion; and
    an arcuate reflector positioned above the antenna for downward shaping the microwave signal.

15. The microwave motion sensor antenna system of claim 14, wherein the antenna includes a plurality of microwave radiating elements.

16. The microwave motion sensor antenna system of claim 14, wherein the antenna includes an array of microwave radiating elements.

17. The microwave motion sensor antenna system of claim 14, wherein the reflector is arcuate with respect to a planar surface of the antenna.

18. The microwave motion sensor antenna system of claim 14, wherein the reflector is arcuate with respect to opposite edges of the antenna.

* * * * *